United States Patent
Miyakoshi

(10) Patent No.: US 9,394,947 B2
(45) Date of Patent: Jul. 19, 2016

(54) DRIVE TRANSMISSION DEVICE AND IMAGE FORMING APPARATUS

(71) Applicant: KYOCERA Document Solutions Inc., Osaka (JP)

(72) Inventor: Naoto Miyakoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/784,168

(22) PCT Filed: Feb. 10, 2015

(86) PCT No.: PCT/JP2015/053623
§ 371 (c)(1),
(2) Date: Oct. 13, 2015

(87) PCT Pub. No.: WO2015/146324
PCT Pub. Date: Oct. 1, 2015

(65) Prior Publication Data
US 2016/0053815 A1    Feb. 25, 2016

(30) Foreign Application Priority Data

Mar. 25, 2014  (JP) ................................. 2014-062037

(51) Int. Cl.
*G03G 15/00*  (2006.01)
*F16D 1/10*  (2006.01)
*F16D 3/04*  (2006.01)
*G03G 21/16*  (2006.01)

(52) U.S. Cl.
CPC .. *F16D 1/10* (2013.01); *F16D 3/04* (2013.01); *G03G 15/757* (2013.01); *G03G 21/1647* (2013.01); *F16D 2001/102* (2013.01); *G03G 2221/1657* (2013.01)

(58) Field of Classification Search
CPC .................................. G03G 15/02; F16D 1/10
USPC ........................................................ 399/167
See application file for complete search history.

(56) References Cited

U.S. PATENT DOCUMENTS

| 4,806,809 A | * | 2/1989 | Kubota | .................. G01P 1/04 310/75 D |
| 2006/0018681 A1 | * | 1/2006 | Kim | .................. G03G 15/757 399/167 |
| 2006/0164500 A1 | * | 7/2006 | Marumoto | .......... G03G 15/757 347/139 |

FOREIGN PATENT DOCUMENTS

| DE | 2260914 A1 | 6/1974 |
| JP | 2004-108481 A | 4/2004 |
| JP | 2009-229889 A | 10/2009 |

OTHER PUBLICATIONS

International Search Report and Written Opinion from PCT/JP2015/053623 dated May 12, 2015.

*Primary Examiner* — Quana M Grainger
(74) *Attorney, Agent, or Firm* — Studebaker & Brackett PC

(57) ABSTRACT

Drive transmission device (10) includes rotatable member (20), driven member (30), driving coupling (21), and driven coupling (31). Both driving protrusions (22) and driven protrusions (32) are arranged at equal intervals in rotation direction (R). Each driving protrusion (22) is in mating contact with corresponding one of driven protrusions (32). Surface (41) of the driving protrusion (22) that is in contact with the driven protrusion (32) includes inner contact region (42) and outer contact region (43). Inner contact region (42) is located at an inner side relative to planned line (LG) of centroid shift extending in rotation direction (R) through centroid (G) of the driving protrusion (22). Outer contact region (43) is located at an outer side relative to planned line (LG) of centroid shift. Along rotation direction (R), each of the inner contact region (42) and the outer contact region (43) extends toward planned line (LG) of centroid shift.

9 Claims, 5 Drawing Sheets

DRIVE TRANSMISSION DEVICE AND IMAGE FORMING APPARATUS

TECHNICAL FIELD

The present invention relates to a drive transmission device and an image forming apparatus.

BACKGROUND ART

An image forming apparatus such as a printer and a copier generally includes a plurality of rollers. For example, an electrophotographic image forming apparatus generally includes a photosensitive drum, a development roller, a transfer roller, a plurality of conveyance rollers, and so on. An inkjet image forming apparatus includes a plurality of conveyance rollers and so on.

Such image forming apparatuses have drive transmission devices for transmitting driving force from drive sources (for example, motors) to the rollers. A drive transmission device has a coupling for connecting a driving shaft and a driven shaft (for example, Patent Literature 1). In the coupling device described in Patent Literature 1, the driving shaft has engagement faces inclined toward the center of rotation thereof by which the center of rotation of the driving shaft and the center of rotation of the driven shaft are aligned.

CITATION LIST

Patent Literature

[Patent Literature 1]
Japanese Patent Application Laid-Open Publication No. 2004-108481

SUMMARY OF INVENTION

Technical Problem

However, the coupling device described in Patent Literature 1 may allow non-uniform rotation because a plurality of protrusions in contact with the engagement faces each have only one contact surface, and therefore the center of rotation of the driving shaft and the center of rotation of the driven shaft may move out of alignment. In particular, if rotation of a photosensitive drum and rotation of a transfer roller in an image forming apparatus are non-uniform, an image may be wrongly positioned in transfer of toner onto paper.

In view of the above-described problem, the present invention has been achieved to provide a drive transmission device and an image forming apparatus that are capable of restricting non-uniform rotation during drive transmission.

Solution to Problem

A drive transmission device according to the present invention includes a rotatable member, a driven member, a driving coupling, and a driven coupling. The rotatable member is rotatable in a rotation direction about a rotation axis. The driven member is driven to rotate by rotation of the rotatable member. The driving coupling is disposed at an end of the rotatable member. The driven coupling is disposed at an end of the driven member. The driving coupling has a plurality of driving protrusions protruding toward the driven coupling. The driven coupling has a plurality of driven protrusions corresponding to the plurality of driving protrusions and protruding toward the driving coupling. Both the plurality of driving protrusions and the plurality of driven protrusions are arranged at equal intervals in the rotation direction. Each of the driving protrusions is in mating contact with the corresponding one of the driven protrusions. A surface of each of the driving protrusions that is in contact with the corresponding one of the driven protrusions has an inner contact region and an outer contact region. The inner contact region is located at an inner side relative to a planned line along which a centroid of the driving protrusion shifts and which extends in the rotation direction through the centroid of the driving protrusion. The outer contact region is located at an outer side relative to the planned line of the centroid shift. Along the rotation direction, each of the inner contact region and the outer contact region extends toward the planned line of the centroid shift.

An image forming apparatus according to the present invention includes the above-described drive transmission device, a drive source, and a roller. The drive source generates driving force. The roller is rotatable. The drive transmission device transmits the driving force from the drive source to the roller.

Advantageous Effects of Invention

Each of the driving protrusions is in mating contact with the corresponding one of the driven protrusions. Along the rotation direction, each of the inner contact region and the outer contact region extends toward the planned line of the centroid shift. Thus, the center of rotation of the driving coupling and the center of rotation of the driven coupling are prevented from moving out of alignment. As a result, non-uniform rotation during drive transmission is restricted.

DESCRIPTION OF EMBODIMENTS

Figure 1A:
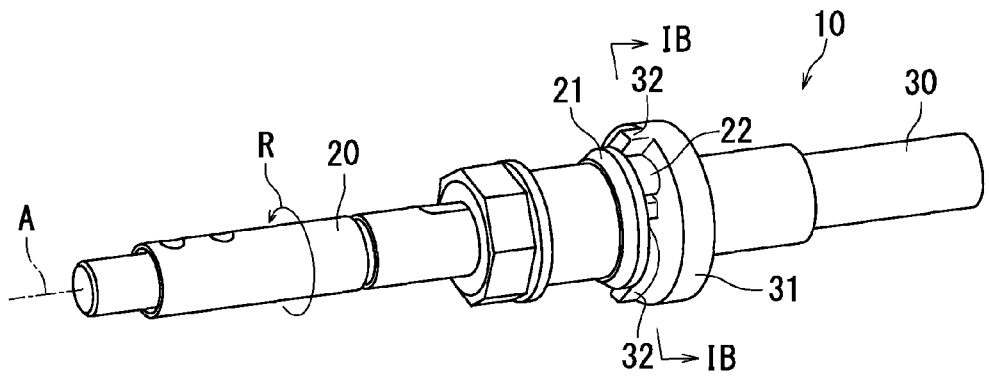
FIG. 1A is a perspective view of a drive transmission device according to a first embodiment of the present invention.

Hereinafter, embodiments of the present invention will be described with reference to the drawings. It should be noted that elements in the drawings that are the same or equivalent are labelled using the same reference signs and description thereof is not repeated.

First Embodiment

Figure 1B:
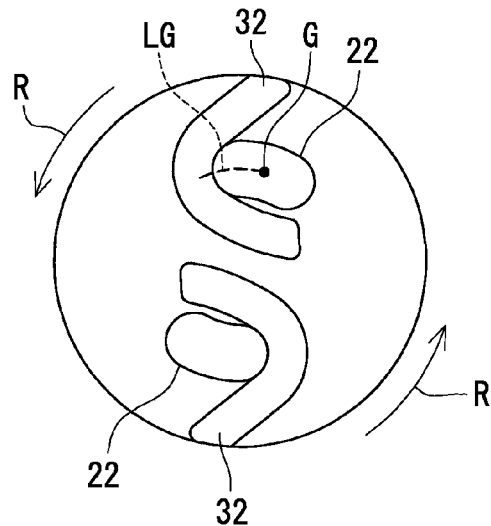
FIG. 1B is a cross-sectional view taken along a line IB-IB in FIG. 1A.
Figure 1C:
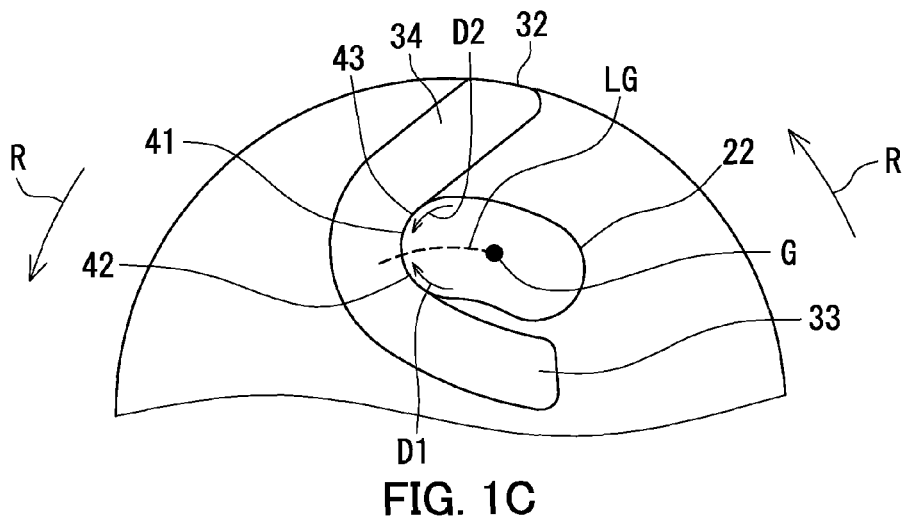
FIG. 1C is an enlarged view of a portion of FIG. 1B.

The first embodiment of a drive transmission device 10 according to the present invention will be described with reference to FIGS. 1A, 1B, and 1C. FIG. 1A is a perspective view of the drive transmission device 10 according to the first embodiment of the present invention. FIG. 1B is a cross-sectional view taken along a line IB-IB in FIG. 1A. FIG. 1C is an enlarged view of a portion of FIG. 1B.

The drive transmission device 10 includes a rotatable member 20, a driven member 30, a driving coupling 21, and a driven coupling 31. The drive transmission device 10 is for example mounted in an image forming apparatus. The drive transmission device 10 transmits driving force from a drive source to a driving target.

The rotatable member 20 is rotatable in a rotation direction R about a rotation axis A. The rotatable member 20 has a cylindrical shape elongated in a direction of the rotation axis A. The rotatable member 20 is for example formed from a metal.

The driven member 30 is driven to rotate by rotation of the rotatable member 20. The driven member 30 has a cylindrical shape elongated in the direction of the rotation axis A. The driven member 30 is for example formed from a metal.

The driving coupling 21 is disposed at an end of the rotatable member 20. The driving coupling 21 is for example formed from polyacetal.

The driven coupling 31 is disposed at an end of the driven member 30. The driven coupling 31 is for example formed from polyacetal.

The rotatable member 20 and the driven member 30 are connected together by engagement between the driving coupling 21 and the driven coupling 31. The rotation of the rotatable member 20 therefore drives the driven member 30 to rotate. The driving coupling 21 and the driven coupling 31 are movable relative to the rotatable member 20 and the driven member 30 to a small extent. If the rotatable member 20 and the driven member 30 become even slightly axially offset in the drive transmission device 10, therefore, the driving coupling 21 and the driven coupling 31 tilt to absorb the axial offset between the rotatable member 20 and the driven member 30 so that drive from the drive source can be transmitted to the driving target.

Connection of the driving coupling 21 and the driven coupling 31 will be described with reference to FIG. 1B.

The driving coupling 21 has a plurality of driving protrusions 22 protruding toward the driven coupling 31. The driving protrusions 22 are elliptically-shaped in a cross-sectional view. The plurality of driving protrusions 22 are arranged at equal intervals in the rotation direction R. A plurality of driven protrusions 32 are arranged at equal intervals in the rotation direction R. Herein, both the plurality of driving protrusions 22 and the plurality of driven protrusions 32 are arranged at 180-degree intervals in the rotation direction.

The driven coupling 31 has the plurality of driven protrusions 32 corresponding to the plurality of driving protrusions 22. The driven protrusions 32 protrude toward the driving coupling 21. The driven protrusions 32 are U-shaped in a cross-sectional view.

Each of the driving protrusions 22 is in mating contact with the corresponding one of the driven protrusions 32.

Next, mating between the driving protrusions 22 and the driven protrusions 32 will be described with reference to FIG. 1C. In FIG. 1C, a planned line LG of centroid shift along which a centroid G shifts extends in the rotation direction R through the centroid G.

Each of the driving protrusions 22 has a contact surface 41 in contact with the corresponding one of the driven protrusions 32. The contact surface 41 includes an inner contact region 42 and an outer contact region 43. The inner contact region 42 is located at an inner side relative to the planned line LG of the centroid shift. The outer contact region 43 is located at an outer side relative to the planned line LG of the centroid shift. The inner contact region 42 extends in a direction D1, and the outer contact region 43 extends in a direction D2. Each of the inner contact region 42 and the outer contact region 43 extends toward the planned line LG of the centroid shift.

Each of the driven protrusions 32 has an inner linear portion 33 and an outer linear portion 34. The inner linear portion 33 is located at an inner side relative to the planned line LG of the centroid shift. The inner linear portion 33 extends toward the planned line LG of the centroid shift (in the direction DD). The outer linear portion 34 is located at an outer side relative to the planned line LG of the centroid shift. The outer linear portion 34 extends toward the planned line LG of the centroid shift (in the direction D2). The inner linear portion 33 and the outer linear portion 34 are joined together.

As described with reference to FIGS. 1A, 1B, and 1C, each of the driving protrusions 22 is in mating contact with the corresponding one of the driven protrusions 32. Each of the inner contact region 42 and the outer contact region 43 extends toward the planned line LG of the centroid shift. Thus, the center of rotation of the driving coupling 21 and the center of rotation of the driven coupling 31 are prevented from moving out of alignment. As a result, non-uniform rotation during drive transmission is restricted.

The plurality of driving protrusions 22 are arranged at equal intervals in the rotation direction R. Thus, the center of rotation of the driving coupling 21 and the center of rotation of the driven coupling 31 are prevented from moving out of alignment.

Figure 2:
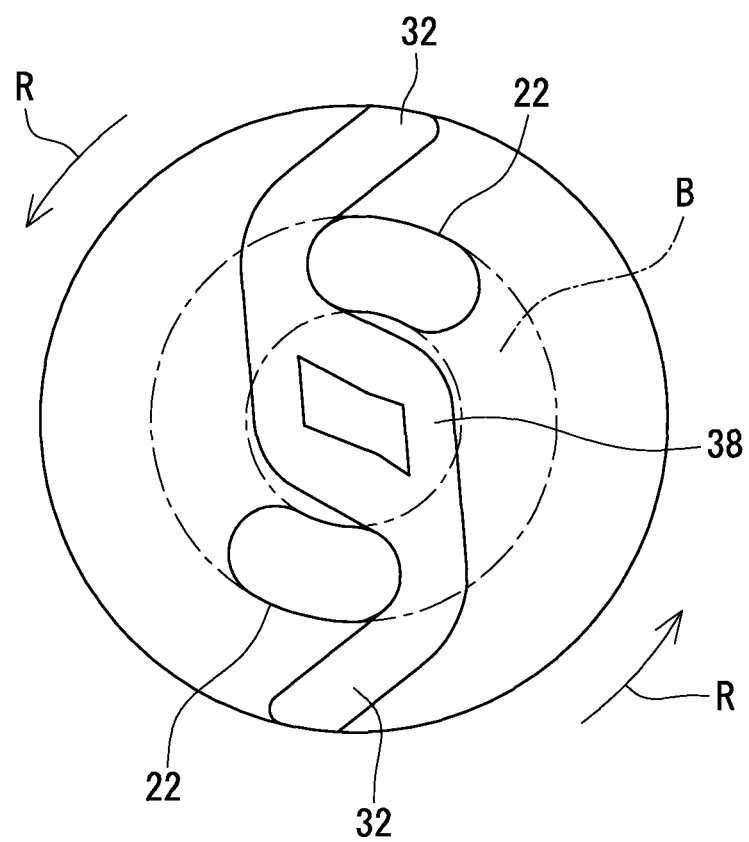
FIG. 2 is a cross-sectional view of driving protrusions and driven protrusions of the drive transmission device according to the first embodiment.

Preferably, the plurality of driven protrusions 32 are joined together as illustrated in FIG. 2. FIG. 2 is a cross-sectional view of the driving protrusions 22 and the driven protrusions 32. A rotational trajectory B represents the rotational trajectory of the driving protrusions 22. The driven protrusions 32 are joined together at a portion 38 that does not overlap the rotational trajectory B of the driving protrusions 22. Since the driven protrusions 32 are joined together, the strength of the driven protrusions 32 is increased, and thus flexing of the driven protrusions 32 is restricted.

Second Embodiment

Figure 3A:
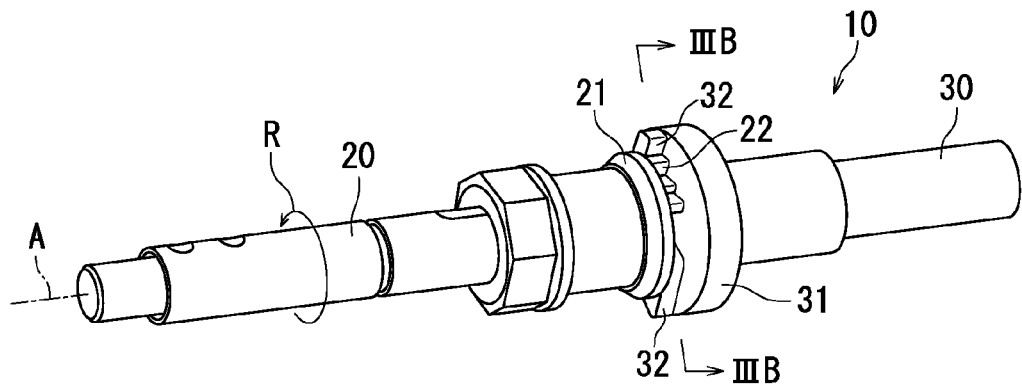
FIG. 3A is a perspective view of a drive transmission device according to a second embodiment of the present invention.
Figure 3B:
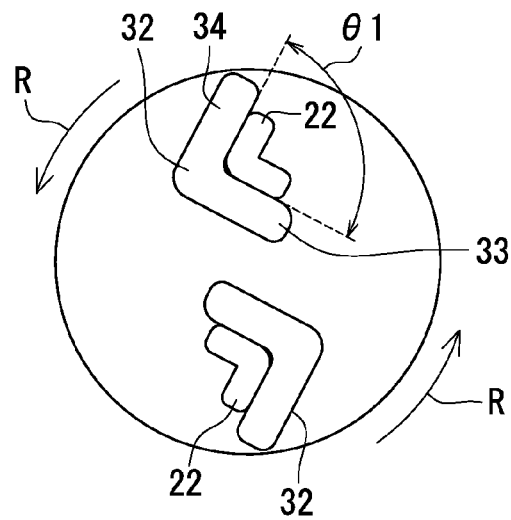
FIG. 3B is a cross-sectional view taken along a line IIIB-IIIB in FIG. 3A.
Figure 3C:
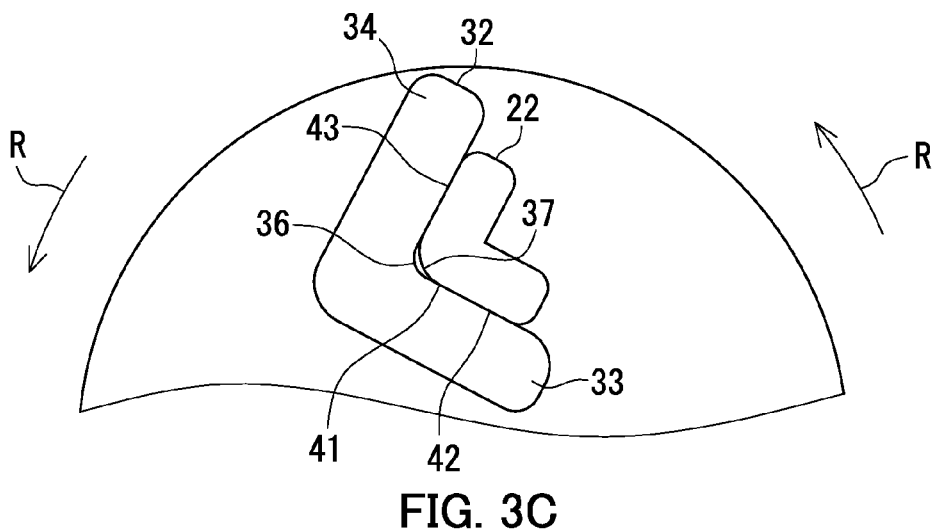
FIG. 3C is an enlarged view of a portion of FIG. 3B.

The second embodiment of the drive transmission device 10 according to the present invention will be described with reference to FIGS. 3A, 3B, and 3C. FIG. 3A is a perspective view of the drive transmission device 10 according to the second embodiment of the present invention. FIG. 3B is a cross-sectional view taken along a line IIIB-IIIB in FIG. 3A. FIG. 3C is an enlarged view of a portion of FIG. 3B. The drive transmission device 10 according to the second embodiment has the same configuration as the drive transmission device 10 according to the first embodiment except for shapes of the driving protrusions 22 and the driven protrusions 32, and therefore the same description will not be repeated.

The driven protrusions 32 are L-shaped in a cross-sectional view as illustrated in FIG. 3B. Preferably, an angle $\theta 1$ formed by the inner linear portion 33 and the outer linear portion 34 is no less than 70° and no greater than 110°. More preferably, the angle $\theta 1$ is 90°. Herein, the angle $\theta 1$ is 90°.

The driving protrusions 22 are L-shaped in a cross-sectional view. The driving protrusions 22 have the same shape as the driven protrusions 32. The driving protrusions 22 are smaller than the driven protrusions 32. Each of the driving protrusions 22 mates with the corresponding one of the driven protrusions 32. The inner contact region 42 and the outer contact region 43 can be increased in size and, as a consequence, the strength of the driven protrusions 32 can be increased, and thus flexing of the driven protrusion 32 can be restricted.

As illustrated in FIG. 3C, a joint section 36 of the inner linear portion 33 and the outer linear portion 34 of each of the driven protrusions 32 has a smaller curvature radius R1 than a section 37 of each of the driving protrusions 22 that is located opposite to the joint section. Accordingly, each of the driving protrusions 22 is in contact with the corresponding one of the driven protrusions 32 in two regions, that is, at the inner contact region 42 and at the outer contact region 43. As a result, the driving protrusion 22 mates with the driven protrusion 32, restricting non-uniform rotation during drive transmission.

Figure 4:
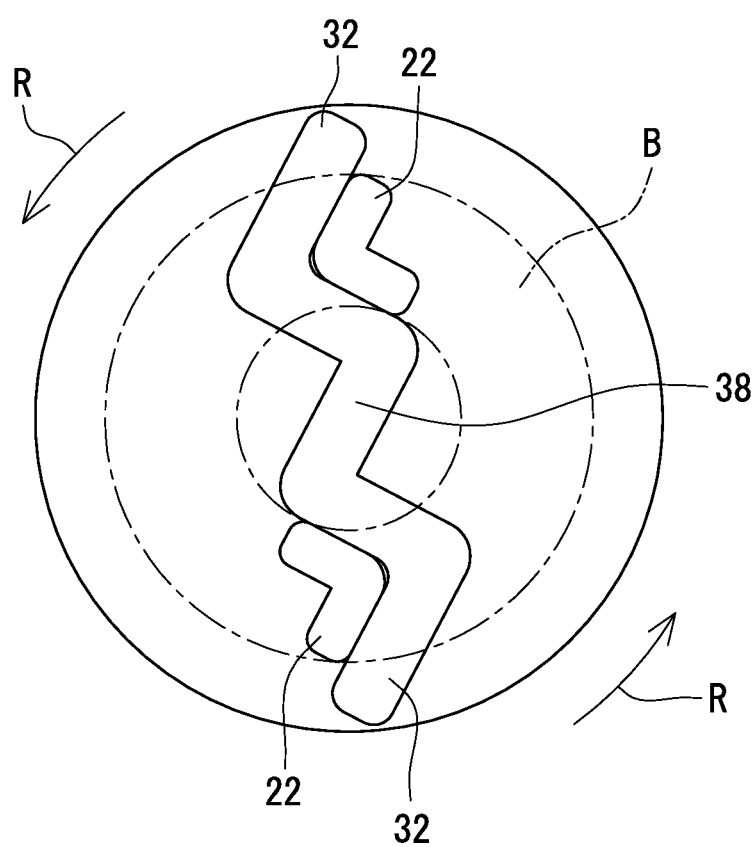
FIG. 4 is a cross-sectional view of driving protrusions and driven protrusions of the drive transmission device according to the second embodiment.

Preferably, the plurality of driven protrusions 32 are joined together as in the driven protrusions 32 illustrated in FIG. 2. FIG. 4 is a cross-sectional view of the driving protrusions 22 and the driven protrusions 32. Since the driven protrusions 32 are joined together, the strength of the driven protrusions 32 is increased, and thus flexing of the driven protrusions 32 can be restricted.

Third Embodiment

Figure 5:
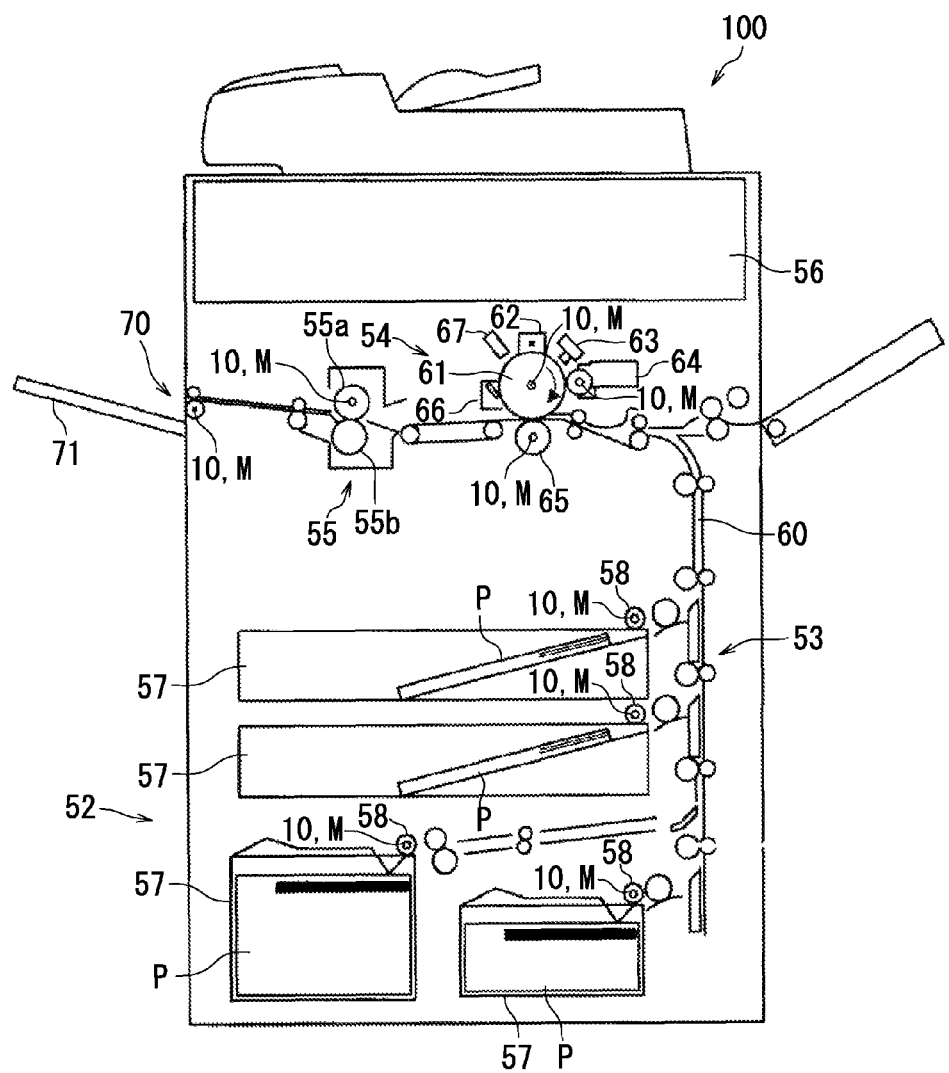
FIG. 5 is a schematic illustration of an image forming apparatus according to a third embodiment of the present invention.

FIG. 5 is a schematic illustration of an image forming apparatus 100 according to the third embodiment of the present invention. The image forming apparatus 100 may be a copier, a printer, or a facsimile machine, or a multifunction peripheral having functions of these machines. Hereinafter, the present invention will be described using a copier as an example of the image forming apparatus 100. However, the present invention is not limited thereto.

The image forming apparatus 100 includes a paper feed section 52 disposed in a lower part of the image forming apparatus 100, a paper conveyance section 53 disposed beside the paper feed section 52, an image forming section 54 disposed above the paper conveyance section 53, a fixing device 55 located downstream of the image forming section 54 in a paper discharging direction, an image reading section 56 disposed above the image forming section 54 and the fixing device 55, a plurality of drive transmission devices 10, and a plurality of drive sources M.

The paper feed section 52 includes a plurality of paper feed cassettes 57 that contain sheets of paper P, which is an example of a recording medium. The sheets of paper P are fed, one sheet at a time, by rotation of a paper feed roller 58 from a paper feed cassette 57 selected from among the plurality of paper feed cassettes 57 to the paper conveyance section 53.

The paper P fed to the paper conveyance section 53 is conveyed toward the image forming section 54 along a paper conveyance path 60 in the paper conveyance section 53. The image forming section 54 forms a toner image on the paper P by an electrophotographic process. The image forming section 54 includes a photosensitive drum 61 supported rotatably in a direction indicated by an arrow in FIG. 5, and a charger 62, a light exposure section 63, a development section 64, a transfer roller 65, a cleaning section 66, and a static eliminating section 67 that are disposed around the photosensitive drum 61.

The charger 62 includes a charging wire to which high voltage is applied. A specified electric potential is applied to a surface of the photosensitive drum 61 by corona discharge from the charging wire to uniformly charge the surface of the photosensitive drum 61. Then, light based on image data of an original document scanned by the image reading section 56 is irradiated onto the photosensitive drum 61 by the light exposure section 63. In response, surface potential of the photosensitive drum 61 is selectively attenuated, and an electrostatic latent image is formed on the surface of the photosensitive drum 61.

Next, the development section 64 develops the electrostatic latent image on the surface of the photosensitive drum 61 to form a toner image on the surface of the photosensitive drum 61. The transfer roller 65 transfers the toner image to the paper P conveyed into a gap between the photosensitive drum 61 and the transfer roller 65.

The paper P having the toner image transferred thereto is conveyed toward the fixing device 55 located downstream of the image forming section 54 in a paper conveyance direction. The fixing device 55 has a pressure roller 55a and a heating roller 55b. The fixing device 55 applies heat and pressure onto the paper P. Thus, the toner image is melted and fixed on the paper P. Next, the paper P having the toner image fixed thereon is ejected onto an exit tray 71 by a pair of ejection rollers 70.

After the transfer of the toner image to the paper P by the transfer roller 65, residual toner on the surface of the photosensitive drum 61 is removed by the cleaning section 66, and residual charge on the surface of the photosensitive drum 61 is removed by the static eliminating section 67. Thereafter, the photosensitive drum 61 is charged again by the charger 62 for image formation to be performed as described above.

The drive transmission devices 10 transmit driving force from the drive sources M to the rollers. The drive sources M are for example motors. In the image forming apparatus 100, the drive transmission devices 10 transmit the driving force from the drive sources M to the paper feed roller 58, the pressure roller 55a, the photosensitive drum 61, and the pair of ejection rollers 70. The drive transmission device 10 according to the first or second embodiment is used particularly favorably in the photosensitive drum 61 and the transfer roller 65, because they need to rotate at the same speed in order to prevent the toner image from being wrongly positioned in the transfer of the toner to the paper P.

The embodiments of the present invention have been described with reference to the drawings (FIGS. 1A to 5) so far. However, the present invention is not limited to the above-described embodiments and can be practiced in various ways within the scope without departing from the essence of the present invention (for example, as described below in sections (1) and (2)). The drawings are intended to emphasize the components in a schematic manner to assist with understanding. The thickness, the length, the number, and so on of the illustrated components are not true to scale for diagrammatic purposes. The material, the shape, the dimensions, and so on of each component shown in the above-described embodiments are only exemplary and do not represent any particular limitations. Various alterations can be made thereto within the scope without substantially departing from the effect of the present invention.

(1) The drive transmission device 10 according to the first and second embodiments includes two driving protrusions 22 and two driven protrusions 32. However, the present invention is not limited to this configuration. For example, the drive transmission device 10 may include three or more driving protrusions 22 and three or more driven protrusions 32.

(2) Both the plurality of driving protrusions 22 and the plurality of driven protrusions 32 are arranged at 180-degree intervals in the rotation direction in the drive transmission device 10 according to the first and second embodiments. However, the angle is not limited to 180 degrees so long as the intervals are equal. In a configuration in which the drive transmission device 10 includes three driving protrusions 22 and three driven protrusions 32, for example, both the plurality of driving protrusions 22 and the plurality of driven protrusions 32 are arranged at 120-degree intervals in the rotation direction.

INDUSTRIAL APPLICABILITY

The present invention is applicable to the field of image forming apparatuses.

The invention claimed is:

1. A drive transmission device comprising:
a rotatable member rotatable in a rotation direction about a rotation axis;
a driven member configured to be driven to rotate by rotation of the rotatable member;
a driving coupling disposed at an end of the rotatable member; and
a driven coupling disposed at an end of the driven member, wherein
the driving coupling has a plurality of driving protrusions protruding toward the driven coupling,
a centroid of each of the plurality of driving protrusions shifts along a corresponding one of planned lines of the centroid shift with rotation of the driving coupling,
each of the planned lines of the centroid shift extends along the rotation direction,
the driven coupling has a plurality of driven protrusions corresponding to the plurality of driving protrusions and protruding toward the driving coupling,
both the plurality of driving protrusions and the plurality of driven protrusions are arranged at equal intervals in the rotation direction,
each of the driving protrusions is in mating contact with the corresponding one of the driven protrusions,
a surface of each of the driving protrusions that is in contact with the corresponding one of the driven protrusions includes an inner contact region located closer to a center of the driving coupling than the corresponding planned line of the centroid shift and an outer contact region located closer to a periphery of the driving coupling than the corresponding planned line of the centroid shift,
the inner contact region extends along a curve transverse to the rotation direction or along a straight line obliquely transverse to the rotation direction toward the corresponding planned line of the centroid shift,
the outer contact region extends along a curve transverse to the rotation direction or along a straight line obliquely transverse to the rotation direction toward the corresponding planned line of the centroid shift,
each of the driven protrusions includes an inner linear portion located closer to a center of the driven coupling than the planned line of the centroid shift for the centroid of the corresponding one of the driving protrusions and an outer linear portion located closer to a periphery of the driven coupling than the planned line of the centroid shift for the centroid of the corresponding one of the driving protrusions,
the inner linear portion linearly extends along a curve transverse to the rotation direction or along a straight line obliquely transverse to the rotation direction toward the corresponding planned line of the centroid shift,
the outer linear portion linearly extends along a curve transverse to the rotation direction or along a straight line obliquely transverse to the rotation direction toward the corresponding planned line of the centroid shift, and
each of the driving protrusions is disposed between the inner linear portion and the outer linear portion of the corresponding one of the driven protrusions.

2. The drive transmission device according to claim 1, wherein
the inner linear portion and the outer linear portion are joined together.

3. The drive transmission device according to claim 2, wherein
the inner linear portion and the outer linear portion form an angle of no less than 70° and no greater than 110°.

4. The drive transmission device according to claim 3, wherein
the inner linear portion and the outer linear portion form an angle of 90°.

5. The drive transmission device according to claim 3, wherein
a joint section of the inner linear portion and the outer linear portion of each of the driven protrusions has a smaller curvature radius than a section of the corresponding one of the driving protrusions that is located opposite to the joint section.

6. The drive transmission device according to claim 3, wherein
the driving protrusions have the same shape as the driven protrusions.

7. The drive transmission device according to claim 3, wherein
the driving protrusions are smaller than the driven protrusions.

8. The drive transmission device according to claim 1, wherein
the plurality of driven protrusions are joined together.

9. An image forming apparatus comprising:
the drive transmission device according to claim 1;
a drive source configured to generate driving force; and
a rotatable roller, wherein
the drive transmission device transmits the driving force from the drive source to the roller.

* * * * *